United States Patent
Legner et al.

(10) Patent No.: US 6,505,529 B1
(45) Date of Patent: Jan. 14, 2003

(54) REVERSING GEAR-BOX WHICH CAN BE SHIFTED WHEN UNDER LOAD

(75) Inventors: Jürgen Legner, Friedrichshafen (DE); Eduard Heilig, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/806,253

(22) PCT Filed: Oct. 6, 1999

(86) PCT No.: PCT/EP99/07512

§ 371 (c)(1),
(2), (4) Date: Mar. 27, 2001

(87) PCT Pub. No.: WO00/22323

PCT Pub. Date: Apr. 20, 2000

(30) Foreign Application Priority Data

Oct. 12, 1998  (DE) .......................... 198 46 955

(51) Int. Cl.[7] .............................. E16H 47/00
(52) U.S. Cl. .................. 74/733.1; 192/87.18; 192/51
(58) Field of Search ................ 74/335, 730.1, 74/732.1, 733.1; 60/428; 477/55, 57; 192/88.13, 88.14, 88.18, 88.19, 51, 58.7; 92/86

(56) References Cited

U.S. PATENT DOCUMENTS

| | | | |
|---|---|---|---|
| 3,741,360 A | 6/1973 | Patton | 192/87.19 |
| 4,706,549 A | 11/1987 | Inagaki et al. | 91/448 |
| 5,918,509 A | 7/1999 | Heilig et al. | 74/730.1 |
| 6,000,515 A | * 12/1999 | Kimmig et al. | 192/70.25 |
| 6,148,982 A | * 11/2000 | Sen | 192/109 F |

FOREIGN PATENT DOCUMENTS

| | | |
|---|---|---|
| DE | 195 17 888 A1 | 11/1996 |
| DE | 196 27 974 A1 | 1/1998 |
| EP | 0 721 074 A2 | 7/1996 |
| EP | 0 818 629 A1 | 1/1998 |

* cited by examiner

*Primary Examiner*—Jack Lavinder
*Assistant Examiner*—C. T. Bartz
(74) *Attorney, Agent, or Firm*—Davis & Bujold, P.L.L.C.

(57) ABSTRACT

A reversing transmission shiftable under load in which the reversing clutches (1, 2) are automatically evacuated by the flow of pressure medium through the clutch (1, 2) not subjected to pressure wherein bores (9, 24), which in this shifting state, are connected to the oil reservoir (5) are placed at the highest point of the piston chamber. The shifting clutches (1, 2) are configured as negative clutches. For modulating the pressure during a reverse shift, an accumulator (27, 28) is provided from which pressure medium flows out via orifices (25, 29). For inching a valve (30) is provided via which the closed clutch (1, 2) can be subjected to a pressure whose level can be continuously varied.

7 Claims, 1 Drawing Sheet ing clutches of the reversing transmission.
REVERSING GEAR-BOX WHICH CAN BE SHIFTED WHEN UNDER LOAD The invention relates to a reversing transmission shiftable under load which preferably has a hydrodynamic torque converter, an input and an output shaft, at least one countershaft and gear wheels; which form a reversing set having shifting clutches with idler wheels which have actuating devices for changing direction which can, optionally, be non-rotatably connected with the input shaft or countershaft.

The transmission, the kind described above, is a reversing transmission, such specially as used in industrial lift trucks, e.g. loaders. It also can be the input unit of a multi-gear reversing transmission, such as specially used in construction machinery, e.g. wheel loaders. Reversing transmissions shiftable under load have several advantages. These transmissions must be compactly built and comfortable to shift. In addition, it is important that the hydraulically actuatable shifting clutches are shifted by modulation of the actuating pressure in such a manner as to have a controlled load take-up. In certain vehicles, e.g. in industrial lift trucks such as forklift trucks or the like, together with the reversing operation, other operating modes are important. Among these are mainly starting, inching and braking.

In DE 195 17 888 is disclosed a reversing transmission shiftable under load having hydrodynamic converter in which the shifting clutches are designed as negative clutches. The modulation of the shifting clutches during a reversal shift is obtained by means of the spring accumulator and the amount of oil flowing out via an orifice. It must be certain that exclusively pressure means and no air be in the piston chambers of the shifting clutches and in the lines, as this disadvantageously affects the modulation of the shifting elements, since in the case of pressure breakdown the air is released thereby changing the shifting time. Since a certain amount of air can get into the pressure means when operating the drive train by rotation of the gears, it is not possible in the transmission disclosed to prevent that pressure fluid from mixing with air sucked by the pump and reaching the lines and piston chambers.

The problem on which this invention is based is to provide a reversing transmission in which the piston chambers and the feed lines thereof are air-free and filled with pressure medium which remains air free during the operation and int the initial starting operation of the drive train and can evacuate themselves and fill with pressure medium.

According to the invention, the problem is solved by the features stated in the characteristic part of claim 1. The piston chamber has a first bore for supply of pressure medium which is preferably placed on the highest point of the piston chamber and through which the piston chamber, with the aid of an actuating device, can communicate either with the pressure means conveyed by a pump or via an orifice with an oil reservoir. By placing a second intake bore in the piston chamber, which is spatially located beneath the first intake bore and is permanently connected with the rate of flow of the pump but at a lower pressure level, a pressure mechanism always flows through the piston chamber when the upper intake bore is connected with the oil reservoir via the actuating device. Thereby air existing in the piston chamber is driven by the pressure medium flowing in through the lower intake bore out of the piston chamber into the upper bore through which it can flow out via the orifice to the oil reservoir. A non-return valve in the lower intake bore prevents the pressure medium from flowing out into the lower intake bore when the upper intake bore is connected with the pump via the actuating device in order to open the clutch. An orifice in the lower intake bore is designed so as to prevent the amount of the pressure medium flowing in through the lower intake bore being larger than the amount flowing out through the upper intake bore via an orifice into the oil reservoir. Undesired pressure build up in the piston chamber is thereby prevented. The reversing transmission shiftable under load has at least two reversing clutches of which one optional clutch is always connected with the pump via the actuating device. Thereby one clutch is in an open state and the non-return valve in the lower intake line of this clutch is closed by the pressure in the piston chamber. A second clutch is connected with the oil reservoir via the actuating device by way of an orifice and is in closed state, its piston chamber being permanently traversed with pressure fluid from the lower intake bore through the orifice in the piston chamber and from there, via the upper intake bore, into the oil reservoir. In a reverse shifting by changing over the actuating device, pressure fluid flows through the first clutch and thereby evacuates it while it is in closed state and the second clutch is opened by pressure fluid. While in initial starting, by repeated operation of the actuating device pressure fluid optionally flows through the first or the second reversing clutch, in each reversing clutch, the air present in the piston chamber is diverted to the oil reservoir. Thereby, even without additional evacuation operations, it is ensured that the intake lines and piston chambers become and remain airless. It is also possible to place the first bore for pressure medium supply beneath the second bore through which pressure fluid always flows through the piston chamber when the first bore is not subjected to pressure. In this case, it must be ensured that the current fluid flow be large enough to entrain and carry off the air present in the piston chamber. In a reversing clutch in which the clutch is closed by spring tension and re-opened by applying a hydraulic pressure and in which it is ensured that there be no air in the intake lines and in the piston chambers, it is always possible to carry out a uniform pressure modulation during the reverse shifting. For this purpose, in the non-return line to the oil reservoir, one orifice is provided with which a spring accumulator is connected in parallel. The accumulator used is designed for reverse shifting. This means that it almost fully absorbs the oil removed in sudden bursts from the piston chamber when actuating the clutch. The subsequent modulation operation develops automatically so that the driver is not burdened from the pressure modulation. The time function to close a shifting clutch can be adjusted by simply varying the orifice opening.

BRIEF DESCRIPTION OF THE DRAWING

The invention will now be described, by way of example, with reference to the accompanying drawings in which.

Figure 1:
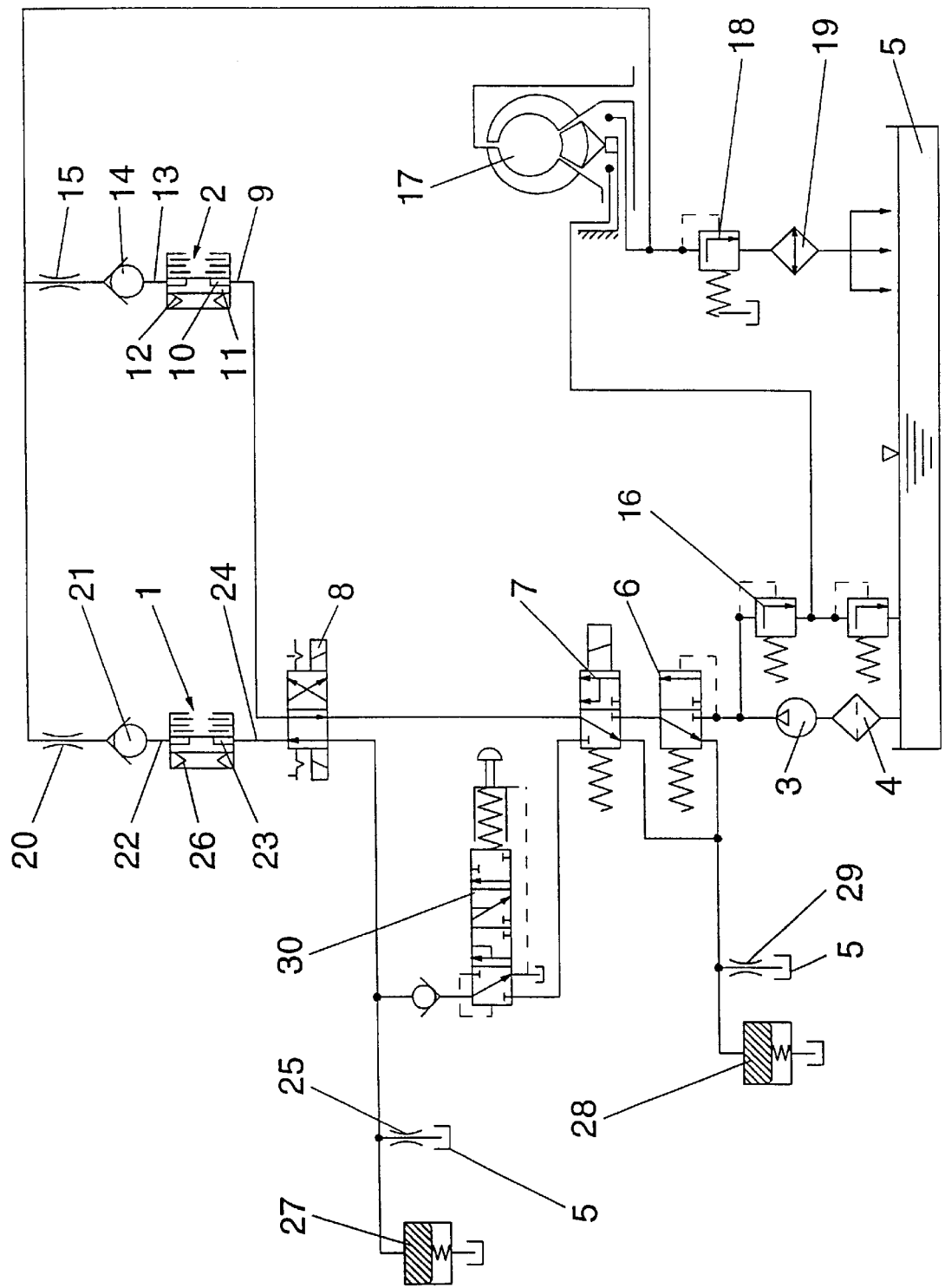
FIG. 1 is a diagram of a hydraulic circuit for actuating shifting clutches of the reversing transmission.

The single Figure shows the diagram of a hydraulic circuit for actuating shifting clutches of tile reversing transmission. By closing the clutch 1 and opening the clutch 2, the vehicle is moved in a forward travel direction, by opening the clutch 2 and closing the clutch 1 the vehicle is moved in a reverse travel direction, by closing the clutch 1 an closing the clutch 2, i.e. by pressureless shifting of the two clutches 1, 2, the vehicle is stopped, that is the vehicle is braked to a parked state. When starting the engine (not shown) the pump 3 is driven. This pump sucks, via a filter 4 pressure fluid, from an oil reservoir 5 and conveys it to a pressure protection valve 6. If a certain pressure is reached, the pressure protection valve 6 opens and conveys pressure fluid from the pump 3 to a brake shift valve 7 which is shown in FIG. 1 in a manner such that the pressure of the pump 3 cannot reach the clutches 1 and 2. In this shifting state of the brake shifting valve 7, the clutches 1 and 2 are connected with the oil reservoir 5 and thus closed and the transmission is stopped in a parked position. If the brake shift valve 7 is shifted to its second position, the pressure fluid reaches the directional valve 8 and from there in the plotted position of the directional valve 8, via an intake bore 9, which must be located in the upper half of the piston chamber 10 and fills the piston chamber 10 with pressure fluid. At the same times the piston 11 of the clutch 2 moves against a tension of the spring 12 and opens the clutch 2. In the lower half of the piston chamber 10 is located an intake bore 13 which has a non-return valve 14 and an orifice 15. The non-return valve 14 is closed by pressure of the pressure fluid in the piston chamber 10. Between the pressure protection valve 6 and the pump 3 is located a pressure-limiting valve 16 which limits the pressure of the pump 3 to about 30 bar. The pressure fluid which flows through the pressure-limiting valve 16 is guided by a hydrodynamic torque converter 17. Part of the pressure fluid flows through a pressure-limiting valve 18 which is adjusted preferably to about 4 bar in order to reach back to the oil reservoir 5 after passing a heat exchanger 19. Another part of the pressure fluid is passed between the hydrodynamic torque converter 17 and the pressure-limiting valve 18, vise the orifices 15 and 20, to the non-return valves 14 and 21. The non-return valve 14 is closed by pressure of the pressure fluid in the piston chamber 10. The pressure fluid reaches through the orifice 20, via the non-return valve 21, over an intake bore 22 placed in the lower area of the piston chamber 23 and fills the piston chamber 23 with pressure fluid. The air in the piston chamber 23, and the subsequently flowing pressure fluid, flows out to an intake bore 24 which is placed at the highest possible point of the piston chamber 23. From the intake bore 24, the air and the pressure fluid reach, via the directional valve 8 and an orifice 25 used to modulate the clutch pressure, the oil reservoir 5. By designing the orifice 20 and the orifice 25 in such a way that a higher pressure level is required to produce flow through the orifice 20 than needed to produce flow through the orifice 25, it is ensured that the clutch 1 closed in this state does not reach, due to reduced closing force of the spring 26 by a counteracting pressure, a slipping state. By pressure fluid permanently flowing through the clutch 1 and the intake bore 24 being located at the uppermost point of the piston chamber, it is ensured that the piston chamber 23 and the intake and non-return lines be completely evacuated. The use of an oil reservoir, located beneath the shifting clutches, rules out the possibility that in a non-return line above the surface of the oil reservoir, the clutch chambers 10 and 23 run empty. The size of the spring accumulator 27, 28, and the design of the orifices 25 and 29, can be exactly determined since a compressible undetermined amount of air in the intake lines or the piston chambers of the clutches 1 and 2 no longer has to be taken into account. Thereby an exact shift modulation can be obtained. By reversing the directional valve 8, clutch 1 is subject to the action of pressure fluid and the non-return valve 21 is closed. The clutch 1 is opened thereby. At the same time closure of clutch 2 is modulatedly, via the orifice 25, and after termination of the closing process is again automatically flowed through and thus evacuated. By this arrangement with the features of the invention upon each shift of travel direction alternatively one piston chamber and the intake and non-return lines of the clutches 1 or 2 is automatically evacuated.

If it is purposefully intended to bring one clutch 1 or 2 to a slipping state, the piston chambers 10 or 23, depending on the position of the directional valve 8, can be subject, via an inching valve 30, to pressure of a varying level.

We claim:

1. A reversing transmission shiftable when under load comprising:

an oil reservoir (5);

a first and second shifting clutches (1, 2) used as reversing clutches and operated by respective first and second piston chambers (10, 23);

an actuating device (8) for controlling the first and second shifting clutches (1, 2), to be shifted to one of a closed position and an open position for a change of driving direction;

the closed position being obtained by lowering a pressure in the piston chambers (10, 23) acting against a respective first and second tension springs (12, 26) in the piston chambers (10, 23) and the open position being obtained by increasing the pressure in the piston chambers (10, 23); and wherein at least one of the first and second piston chambers (10, 23) has a first and a second intake bore (9, 13, 22, 24), the first intake bore (13, 22) is closed by a valve (14, 21) when the second intake bore (9, 24) is subjected to pressure, and the first intake bore (13, 22) is opened to allow fluid flow through the piston chambers (10, 23) when the second intake bore (9, 24) is connected via said actuating device (8) with the oil reservoir (5).

2. The reversing transmission according to claim 1, wherein the second intake bore (9, 24) is connected to said oil reservoir (5) via an orifice (25, 29), and further connected with a spring accumulator (27, 28), via the actuating device (8), said orifice (25, 29) providing a significant increase in the pressure in the piston chamber (10, 23) when the first intake bore (13, 22) is opened.

3. The reversing transmission according to claim 1, wherein the second intake bore (9, 24) is only subjected to pressure via the actuating device (8) when the available pressure is above a specific value.

4. The reversing transmission according to claim 1, wherein the first and second piston chambers (10, 23) are connected with the oil reservoir (5) via the actuating device (8) and an orifice (25), the piston chambers (10, 23) can be subjected to a continuously variable pressure level via a second actuating device (30).

5. A reversing transmission shiftable when under load comprising:

an oil reservoir (5);

a first and second shifting clutches (1, 2) used as reversing clutches and operated by respective first and second piston chambers (10, 23);

an actuating device (8) for controlling the first and second shifting clutches (1, 2), to be shifted to one of a closed position and an open position for a change of driving direction;

the closed position being obtained by lowering a pressure in the piston chambers (10, 23) acting against a respective first and second tension springs (12, 26) in the piston chambers (10, 23) and the open position being obtained by increasing the pressure in the piston chambers (10, 23);

at least one of the first and second piston chambers (10, 23) has a first and a second intake bore (9, 13, 22, 24), the first intake bore (13, 22) is closed by a valve (14, 21) when the second intake bore (9, 24) is subjected to pressure, and the first intake bore (13, 22) is opened to allow fluid flow through the piston chambers (10, 23) when the second intake bore (9, 24) is connected via said actuating device (8) with the oil reservoir (5); and wherein the second intake bore (9, 24) is connected to said oil reservoir (5) via an orifice (25, 29), and further connected with a spring accumulator (27, 28), via the actuating device (8), said orifice (25, 29) providing a significant increase in the pressure in the piston chamber (10, 23) when the first intake bore 13, 22 is opened.

6. The reversing transmission according to claim 5, wherein the second intake bore (9, 24) is only subjected to pressure via the actuating device (8) when the available pressure is above a specific value.

7. The reversing transmission according to claim 5, wherein the first and second piston chambers (10, 23) are connected with the oil reservoir (5) via the actuating device (8) and an orifice (25), the piston chambers (10, 23) can be subjected to a continuously variable pressure level via a second actuating device (30).

* * * * *